(12) United States Patent
Seki

(10) Patent No.: US 8,238,815 B2
(45) Date of Patent: Aug. 7, 2012

(54) WIRELESS RELAY DEVICE

(75) Inventor: Hiroyuki Seki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 355 days.

(21) Appl. No.: 12/603,084

(22) Filed: Oct. 21, 2009

(65) Prior Publication Data

US 2010/0105320 A1 Apr. 29, 2010

(30) Foreign Application Priority Data

Oct. 23, 2008 (JP) ................. 2008-272619

(51) Int. Cl.
*H04B 3/36* (2006.01)
*H04B 1/02* (2006.01)
*H04B 7/16* (2006.01)
*H04B 7/14* (2006.01)

(52) U.S. Cl. .................. 455/11.1; 455/7; 455/9; 455/16

(58) Field of Classification Search ............. 455/7, 11.1, 455/9, 15, 16
See application file for complete search history.

(56) References Cited

U.S. PATENT DOCUMENTS

| 6,385,435 | B1* | 5/2002 | Lee ................. 455/24 |
|---|---|---|---|
| 6,987,989 | B2* | 1/2006 | Hiramatsu et al. ......... 455/562.1 |
| 7,778,611 | B2* | 8/2010 | Asai et al. ....... 455/78 |
| 7,826,337 | B2* | 11/2010 | Shi et al. ........ 370/201 |
| 7,826,541 | B2* | 11/2010 | Fujii et al. ...... 375/260 |
| 7,848,711 | B2* | 12/2010 | Asai et al. ....... 455/78 |
| 7,911,985 | B2* | 3/2011 | Proctor et al. .......... 370/279 |
| 8,116,239 | B2* | 2/2012 | Proctor et al. .......... 370/279 |
| 2005/0190822 | A1 | 9/2005 | Fujii et al. |
| 2007/0129008 | A1* | 6/2007 | Shi et al. ........ 455/11.1 |
| 2007/0274372 | A1* | 11/2007 | Asai et al. ...... 375/130 |
| 2010/0062708 | A1* | 3/2010 | Sangiamwong et al. ....... 455/24 |

FOREIGN PATENT DOCUMENTS

| JP | 2003-174392 | 6/2003 |
|---|---|---|
| JP | 2005-236626 | 9/2005 |

OTHER PUBLICATIONS

Kazuhito Itoh et al; Radio Network Development Department, NTT Mobile Communications Network Inc.; "A Booster using Adaptive Interference Canceller for Pager System"; The Institute of Electronics, Information and Communication Engineers; Technical Report of IEICE RCS 99-78; Dated Aug. 1999. Partial English translation.

* cited by examiner

*Primary Examiner* — Tilahun B Gesesse
(74) *Attorney, Agent, or Firm* — Myers Wolin, LLC

(57) ABSTRACT

A wireless device includes a plurality of generating units a weight defined as a ratio at which to minimize signal power of a synthesized signal into which a coupling loop interference cancellation signal canceling coupling loop interference getting wrapped around and received by a receiving unit when transmitting a relay signal to the outside from a single transmitting unit based on the radio signal and generated by changing an amplitude and a phase of the relay signal at a setting-enabled ratio, is cancelled from the reception signal; a plurality of canceling units outputting a signal into which the signal of the coupling loop interference is cancelled, based on the weight generated by the generating unit, from the signal; a plurality of transmitting units transmitting the signal as the radio signal, which is output by the canceling unit; and a plurality of switching units cutting off the transmission of the signal.

6 Claims, 11 Drawing Sheets

WIRELESS RELAY DEVICE

CROSS-REFERENCE TO RELATED APPLICATION

This application is based upon and claims the benefit of priority of the prior Japanese Patent Application No. 2008-272619 filed on Oct. 23, 2008, the entire contents of which are incorporated herein by reference.

FIELD

The present invention relates to a wireless relay device in a Multiple Input Multiple Output (MIMO) communication system for multiple-input multiple-output communications in which transmission signals transmitted from a plurality of transmitting antennas are received by a plurality of antennas.

BACKGROUND

FIG. 1 is a diagram illustrating an example of a mode of utilizing the wireless relay device.

The wireless relay device relays radio waves by amplifying and thus transmitting the radio waves received from a wireless base station toward an area at a far distance from the wireless base station and an area with an extremely low intensity of receiving the radio waves such as within a building and in an underground shopping mall. In cellular mobile communications, as in FIG. 1, the wireless relay device, when relaying between the wireless base station and a terminal, performs bidirectional relay, i.e., a case of receiving the signal from the wireless base station and transmitting the signal to the terminal and a case of receiving the signal from the terminal and transmitting the signal to the wireless base station.

It is an important problem of how to prevent oscillations caused when the signal amplified and thus transmitted by the wireless relay device is received by the receiving antenna of a self-device and further amplified. A contrivance for preventing the oscillations involves taking large isolation between the transmitting antenna and the receiving antenna of the wireless relay device. To be specific, schemes are exemplified such as setting a far distance between the transmitting antenna and the receiving antenna of the wireless relay device, providing a shielding object between the transmitting antenna and the receiving antenna, and adjusting directivity and polarization of each of the transmitting antenna and the receiving antenna.

The radio waves, however, get wrapped around the receiving antenna from the transmitting antenna due to reflections, diffractions, transmissions, etc, depending on an ambient environment. Therefore, a general method involves employing a coupling loop interference cancellation technology of canceling interference waves getting wrapped around the receiving antenna from the transmitting antenna by signal processing in combination with the scheme of physically ensuring the isolation between the transmitting antenna and the receiving antenna. For example, if a relay gain of the wireless relay device is set to 70 dB, it is desirable to ensure attenuation of the coupling loop interference having 80 dB or above as a total value of the isolation between the transmitting antenna and the receiving antenna and coupling loop interference suppression performance in order to ensure 10 dB or above as an S/N ratio (Signal to Noise Ratio) of the signal to be relayed.

Thus, the isolation between the transmitting antenna and the receiving antenna and the coupling loop interference cancellation technology are important to the wireless relay device. Especially in the case of the large coupling loop interference cancellation performance, the restriction of the isolation between the transmitting antenna and the receiving antenna can be reduced. Hence, there is a decreased restraint of a method of installing the wireless relay device, and introduction of the wireless relay device can be facilitated.

A specific coupling loop interference cancellation method is exemplified by the following technologies (Non-Patent document 1, Patent document 1, Patent document 2). In a scheme of canceling the signal, obtained in a way that multiples the transmission signal by the coupling loop interference cancellation weight, from the reception signal, there is a method of calculating a coupling loop interference cancellation weight by an adaptive algorithm so as to minimize signal power after being cancelled.

FIG. 2 is a diagram illustrating an example of a configuration of the conventional wireless relay device.

The wireless relay device in FIG. 2 uses the coupling loop interference cancellation method based on the adaptive algorithm. A signal into which the signal from the wireless base station is synthesized with the coupling loop interference is inputted to a receiving antenna. A receiver executes processes such as extracting a necessary band with a filter, conducting a conversion into a baseband signal with a down-converter, adjusting a signal level under AGC (Auto Gain Control), and performing a conversion into a digital signal with an A/D (Analog to Digital) converter. In a transmitter, the digital signal is converted again into the analog baseband signal by a D/A (Digital to Analog) converter. The analog baseband signal is, after being converted into an RF (Radio Frequency) signal by an up-converter and amplified by an amplifier, transmitted from the transmitting antenna.

Inputted to a coupling loop interference cancellation weight generator are a signal after the coupling loop interference cancellation and a signal obtained by delaying the transmission signal corresponding to the coupling loop interference. The coupling loop interference cancellation weight generator generates a coupling loop interference cancellation weight W for minimizing the signal power after the coupling loop interference cancellation based on an LMS (Least Mean Square) algorithm. A value, which is acquired in a way that multiples the signal acquired by delaying the transmission signal by the coupling loop interference cancellation weight W, is subtracted from the reception signal. A subtracted result is a signal after the coupling loop interference cancellation. The signal after the coupling loop interference cancellation becomes a transmission signal.

In the technology described above, a pilot signal is transmitted from the wireless relay device, and the coupling loop interference cancellation weight is calculated by estimating a state of a coupling loop interference propagation path. The coupling loop interference cancellation method using the pilot signal enables a propagation characteristic of the coupling loop interference to be calculated directly, however, unnecessary interference waves other than the signals to be relayed are transmitted because of transmitting the pilot signals.

[Non-Patent document 1] Kazuto Itoh and one other, "Booster Using Adaptive Coupling loop interference Canceller", Report of Technical and Research, compiled by the Institute of Electronics and Communication Engineers of Japan, August in 1999, RCS99-78.

[Patent document 1] Japanese Patent Laid-Open Publication No. 2003-174392

[Patent document 2] Japanese Patent Laid-Open Publication No. 2005-236626

A wireless relay device disclosed herein adopts the following means.

SUMMARY

According to an aspect of the invention, a wireless device connected to a plurality of wireless control devices connecting with a monitoring device, and controlled and monitored by the monitoring device via the wireless control device, the wireless device includes a transmitting and receiving unit transmitting and receiving a signal to and from the wireless control device. The wireless device includes a selecting unit selecting, from within the plurality of wireless control devices, the one wireless control device which transmits and receives a control and monitor signal, contained in the signal, by which the monitoring device controls and monitors a self-device.

Namely, a first mode is a wireless relay device including: a first receiving unit receiving a radio signal; a first generating unit generating a coupling loop interference cancellation weight calculated as a ratio at which to minimize signal power of a synthesized signal generated by canceling, from the reception signal received by the first receiving unit, a coupling loop interference cancellation signal canceling coupling loop interference getting wrapped around and received by the first receiving unit when transmitting a relay signal to the outside from a single transmitting unit based on the radio signal and generated by changing an amplitude and a phase of the relay signal at a setting-enabled ratio; a first canceling unit outputting a signal into which the signal of the coupling loop interference is cancelled, based on the coupling loop interference cancellation weight generated by the first generating unit, from the signal received by the first receiving unit; a first transmitting unit transmitting the signal as the radio signal, which is output by the first canceling unit; a first switching unit capable of cutting off the transmission of the signal from the first transmitting unit; a second receiving unit receiving the radio signal; a second generating unit generating a coupling loop interference cancellation weight calculated as a ratio at which to minimize the signal power of the synthesized signal generated by canceling, from the reception signal received by the second receiving unit, the coupling loop interference cancellation signal canceling the coupling loop interference getting wrapped around and received by the second receiving unit when transmitting the relay signal to the outside from the single transmitting unit based on the radio signal and generated by changing the amplitude and the phase of the relay signal at the setting-enabled ratio; a second canceling unit outputting the signal into which the signal of the coupling loop interference is cancelled, based on the coupling loop interference cancellation weight generated by the second generating unit, from the signal received by the second receiving unit; a second transmitting unit transmitting the signal as the radio signal, which is output by the second canceling unit; and a second switching unit capable of cutting off the transmission of the signal from the second transmitting unit, wherein when the first switching unit cuts off the transmission of the signal from the first transmitting unit, the first generating unit generates a third coupling loop interference cancellation weight for canceling the signal of the coupling loop interference of the radio signal from the second transmitting unit from the reception signal of the first receiving unit, while the second generating unit generates a second coupling loop interference cancellation weight for canceling the signal of the coupling loop interference of the radio signal from the second transmitting unit from the reception signal of the second receiving unit, wherein when the second switching unit cuts off the transmission of the signal from the second transmitting unit, the first generating unit generates a first coupling loop interference cancellation weight for canceling the signal of the coupling loop interference of the radio signal from the first transmitting unit from the reception signal of the first receiving unit, while the second generating unit generates a fourth coupling loop interference cancellation weight for canceling the signal of the coupling loop interference of the radio signal from the first transmitting unit from the reception signal of the second receiving unit, wherein the first canceling unit outputs a signal into which a signal obtained by changing the amplitude and the phase of the transmission signal that should be transmitted by the first transmitting unit at a ratio designated by the first weight and a signal obtained by changing the amplitude and the phase of the transmission signal that should be transmitted by the second transmitting unit at a ratio designated by the third weight, are canceled from the signal received by the first receiving unit, and wherein the second canceling unit outputs a signal into which a signal obtained by changing the amplitude and the phase of the transmission signal that should be transmitted by the first transmitting unit at a ratio designated by the fourth weight and a signal obtained by changing the amplitude and the phase of the transmission signal that should be transmitted by the second transmitting unit at a ratio designated by the second weight, are canceled from the signal received by the second receiving unit.

Further, a second mode is a wireless relay device including: (A) a plurality of relay units each having: (a) a receiving unit receiving a radio signal; (b) a generating unit generating a coupling loop interference cancellation weight calculated as a ratio at which to minimize signal power of a synthesized signal generated by canceling, from the radio signal received by the receiving unit, a coupling loop interference cancellation signal canceling coupling loop interference getting wrapped around and received by the receiving unit when transmitting a relay signal to the outside from a single transmitting unit based on the radio signal and generated by changing an amplitude and a phase of the relay signal at a setting-enabled ratio; (c) a canceling unit outputting a signal into which the signal of the coupling loop interference is cancelled, based on the coupling loop interference cancellation weight generated by the generating unit, from the signal received by the receiving unit; and (d) a transmitting unit transmitting the signal output by the canceling unit as the radio signal; and (B) a switching unit transmitting the radio signal from the transmitting unit of one of the plurality of relay units and cutting off the transmissions of the radio signals from the transmitting units of the relay units other than the one relay unit, wherein the switching unit sequentially switching over the single relay unit which transmits the radio signal, wherein the generating unit of the each relay unit generates, on a per-transmitting-unit basis of the single relay unit which transmits the radio signal, a coupling loop interference cancellation weight for canceling the signal of the coupling loop interference of the radio signal from the transmitting unit of the single relay unit which transmits the radio signal from the reception signal of the receiving unit of the each relay unit, and wherein the canceling unit of the each relay unit outputs a signal obtained by canceling the signal of the coupling loop interference from the each transmitting unit from the signal received by the receiving unit of the relay unit based on the weight per the transmitting unit, which is generated by the generating unit of the relay unit.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

An embodiment will hereinafter be described with reference to the drawings. A configuration in the embodiment is an exemplification, and the present invention is not limited to the configuration in the embodiment.

In a mobile communication system of the next generation, the data communications are carried out at a higher speed by use of a communication system called a MIMO (Multiple Input Multiple Output) system. In the MIMO communication system, the signals of a plurality of independent data channels are transmitted at the same timing and the same frequency by employing a plurality of transmitting antennas. A receiving side configures MIMO channels by using a plurality of receiving antennas, whereby the plurality of data channels can be demodulated in separation.

Moreover, the mobile communication system of the next generation carries out a broadband transmission and therefore uses a higher carrier frequency. Attenuation in distance becomes larger as the frequency gets higher, and it is therefore presumed that there is an increased number of areas in which the radio waves are hard to reach. Therefore, the mobile communication system of the next generation has an increased necessity for the wireless relay device. Under such circumstances, a technology of realizing the high-speed data communications in the broad area by relaying the MIMO signals is requested of the mobile communication system of the next generation.

Figure 3:
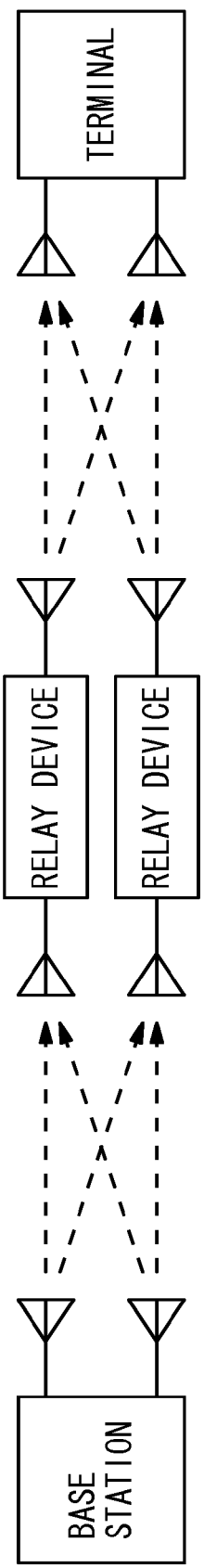
FIG. 3 is a diagram illustrating an example of a MIMO communication system.

FIG. 3 is a diagram illustrating an example of the MIMO communication system.

One relay system of the wireless relay device using one transmitting antenna and one receiving system is insufficient for relaying the MIMO signals. The relay of the MIMO signals requires a plurality of relay devices as depicted in FIG. 3. In the MIMO relay system in FIG. 3, a wireless base station includes two transmitting antennas, and a terminal has two receiving antennas. In the example in FIG. 3, the relay of independent (2×2) pieces of MIMO channels can be attained by performing the wireless relay in the two relay systems.

FIG. 3 illustrates how the downlink relay from the wireless base station to the terminal is conducted, however, in the case of performing the MIMO transmission, the plurality of relays is needed also in an uplink from the terminal to the wireless base station. The following discussion will be made by exemplifying only one-way wireless relay for simplicity.

The wireless relay device, which relays the MIMO signals, simultaneously relays the independent signals from the plurality of transmitting antennas. Hence, the receiving antennas of the wireless relay device receive plural lines of independent coupling loop interference from the plurality of transmitting antennas.

Figure 1:
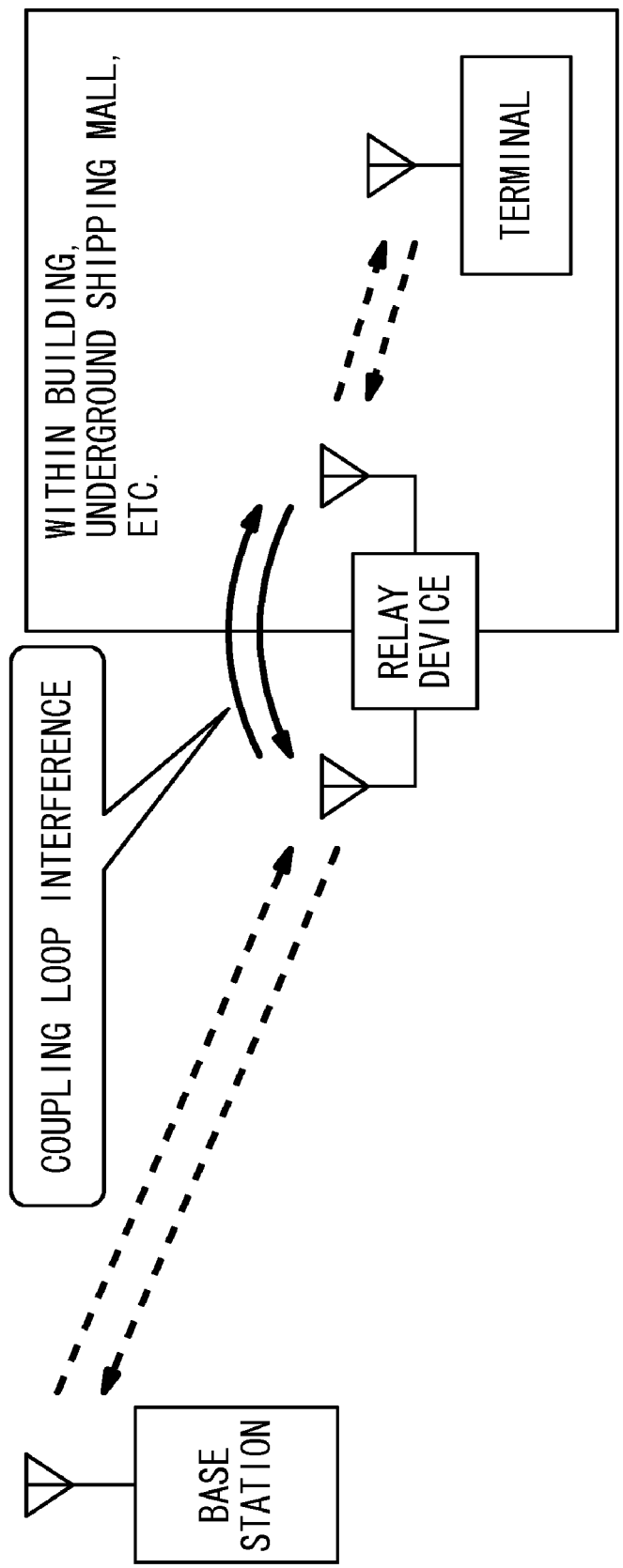
FIG. 1 is a diagram illustrating an example of a mode of utilizing a wireless relay device.
Figure 2:
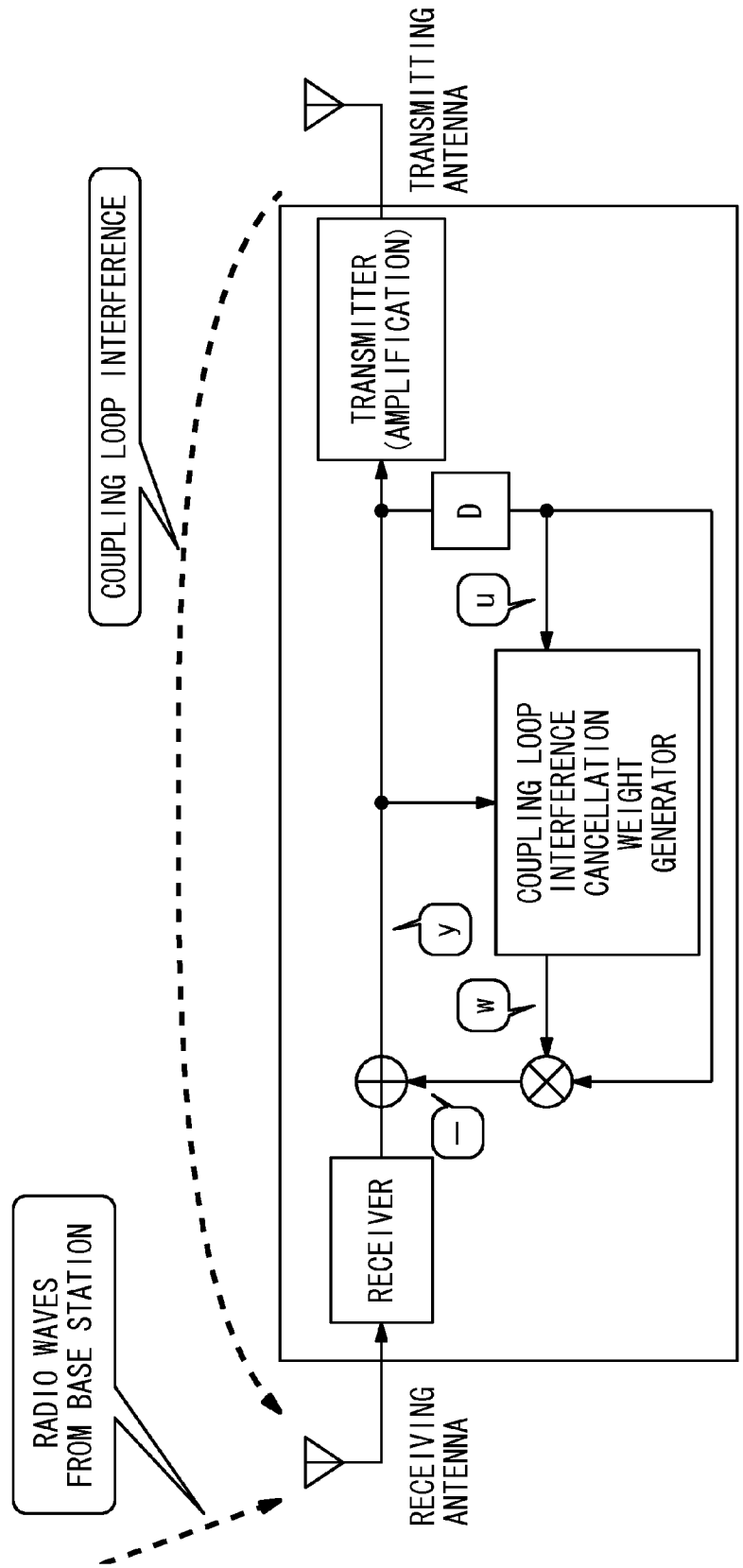
FIG. 2 is a diagram illustrating a configuration of a conventional wireless relay device.
Figure 4:
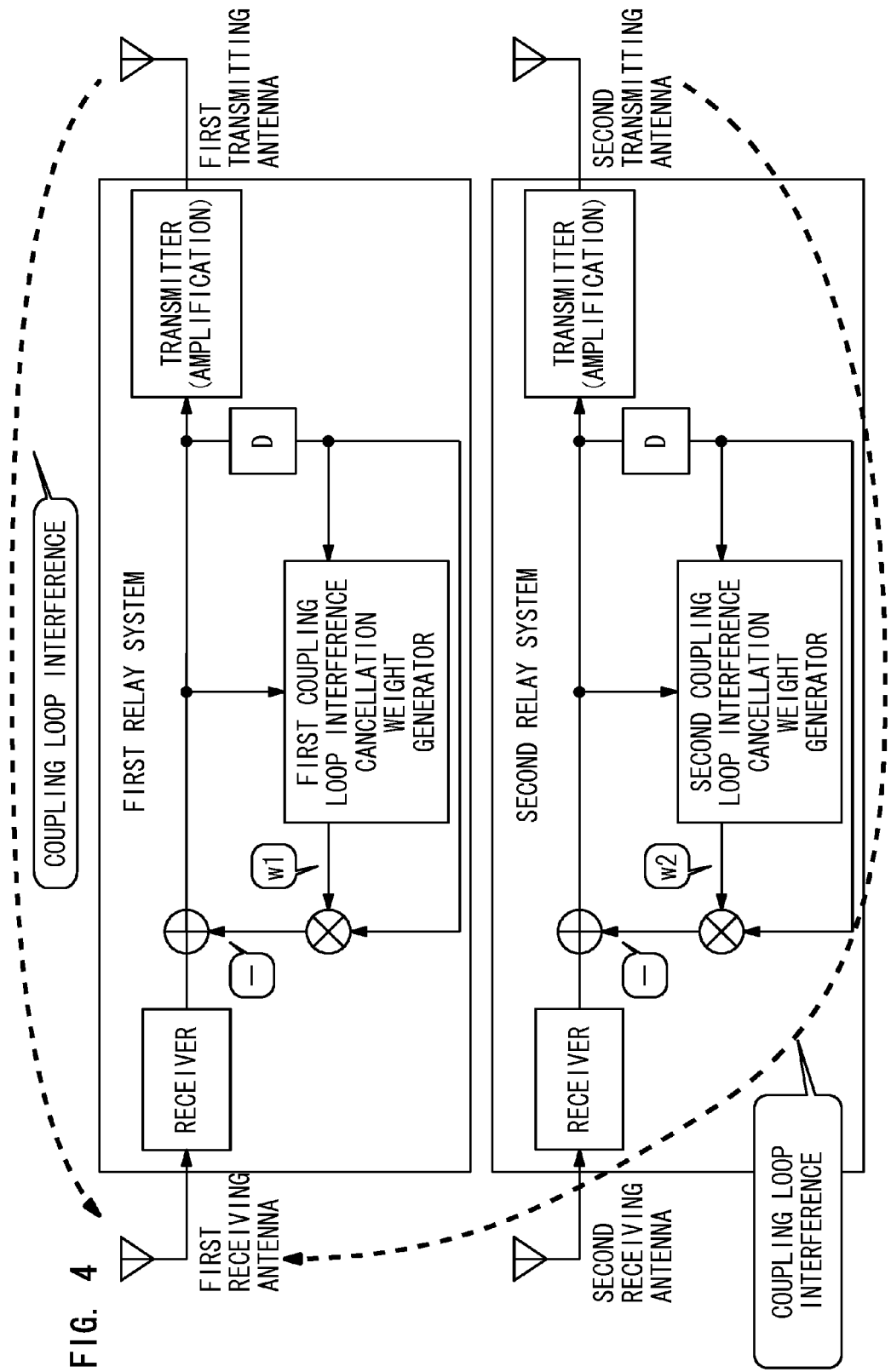
FIG. 4 is a diagram illustrating an example of the configuration in a case where the MIMO relay is actualized by arranging the conventional relay devices depicted in FIG. 2 in two systems.

FIG. 4 is a diagram illustrating an example of a configuration in the case of actualizing the MIMO relay by arranging the conventional relay devices illustrated in FIG. 2 in two systems. The example in FIG. 4 is that a first receiving antenna receives the coupling loop interference from a second transmitting antenna as well as receiving the coupling loop interference from a first transmitting antenna. In the configuration in FIG. 4, a first relay system can generate only the coupling loop interference cancellation weight of canceling the coupling loop interference from the first transmitting antenna and is therefore disabled from canceling influence of the coupling loop interference from the second transmitting antenna.

On the other hand, according to a method of estimating the coupling loop interference cancellation weight by transmitting the pilot signal for calculating the coupling loop interference cancellation weight from the wireless relay device, each weight for the independent coupling loop interference can be calculated as far as the pilot signals transmitted from the plurality of transmitting antennas are orthogonal.

In this method, the relay device adds the plurality of pilot signals to data signals and thus transmits the signals. The interference with the should-be-originally-transmitted data signals increases. Further, preparation for the special pilot signals for the coupling loop interference cancellation involves performing the coupling loop interference cancellation by changing the specifications themselves of the communication system. Accordingly, it is desirable to generate the coupling loop interference cancellation weight by use of a comparatively simple adaptive algorithm and to cancel the coupling loop interference without employing the special pilot signals in the wireless relay device for the MIMO signals.

[Embodiment]

Herein, a wireless relay device, which receives radio waves from a wireless base station and transmits the radio waves toward a terminal, will be described, however, similarly another applicable wireless relay device is a wireless relay device which receives the radio waves from the terminal and transmits the radio waves toward the wireless base station.

EXAMPLE OF CONFIGURATION

Figure 5:
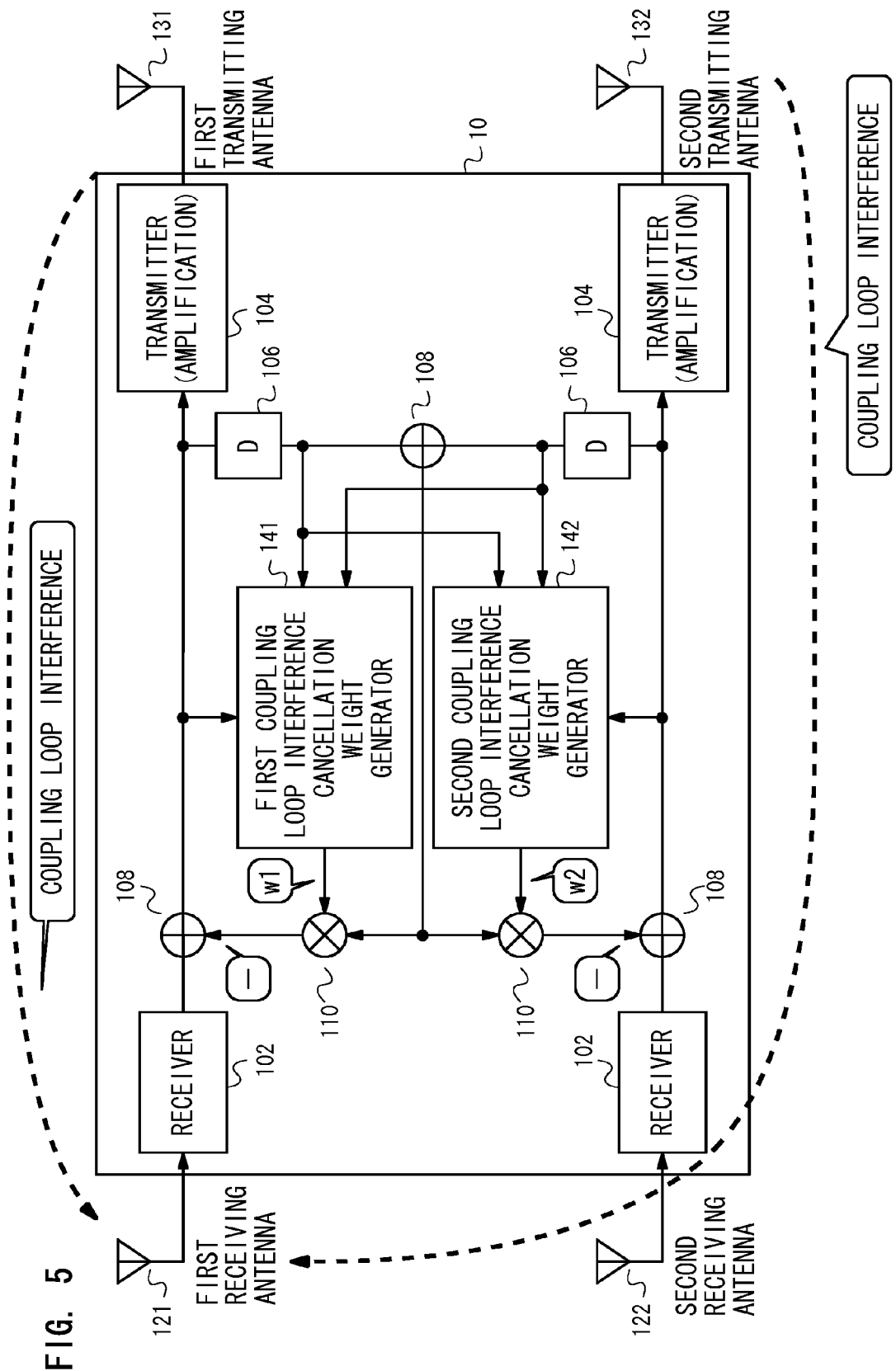
FIG. 5 is a diagram illustrating an example of the configuration of the wireless relay device.

FIG. 5 is a diagram illustrating an example of a configuration of the wireless relay device.

A wireless relay device 10 includes a first receiving antenna 121, a second receiving antenna 122, a receiver 102 which receives signals from any one of the receiving antennas, a plurality of adding units 108 and a plurality of multiplying units 110. Further, the wireless relay device 10 includes a first coupling loop interference cancellation weight generator 141, a second coupling loop interference cancellation weight generator 142 and a plurality of delay units 106. Moreover, the wireless relay device 10 has a first transmitting antenna 131, a second transmitting antenna 132 and a transmitter 104 which transmits the signals from any one of the transmitting antennas.

A first relay system is configured by the first receiving antenna 121, the receiver 102 connecting with the first receiving antenna 121, the first coupling loop interference cancellation weight generator 141, the transmitter 104 connecting with the first transmitting antenna 131, the first transmitting antenna 131 and concomitant components thereof.

Similarly, a second relay system is configured by the second receiving antenna 122, the receiver 102 connecting with the second receiving antenna 122, the second coupling loop interference cancellation weight generator 142, the transmitter 104 connecting with the second transmitting antenna 132, the second transmitting antenna 132 and concomitant components thereof.

The signals are inputted to the first coupling loop interference cancellation weight generator 141, such as a signal into which a signal obtained in a way that multiplies, by a coupling loop interference cancellation weight, a sum of a signal acquired by delaying the transmission signal of the first relay system and a signal acquired by delaying the transmission signal of the second relay system is cancelled from the reception signal of the first relay system, the signal acquired by delaying the transmission signal of the first relay system and the signal acquired by delaying the transmission signal of the second relay system. The first coupling loop interference cancellation weight generator 141 calculates, based on an adaptive algorithm, the coupling loop interference cancellation weight of the first relay system by use of those inputted signals. The first coupling loop interference cancellation weight generator 141 may also calculate, based on another algorithm, the coupling loop interference cancellation weight of the first relay system.

The receiver 102 executes processes of extracting a necessary band with a filter, conducting a conversion into a baseband signal with a down-converter, adjusting a signal level under AGC (Auto Gain Control), and performing a conversion into a digital signal with an A/D (Analog to Digital) converter.

The wireless relay device 10 multiplies, by use of a multiplier 110, the coupling loop interference cancellation weight generated by the first coupling loop interference cancellation weight generator 141 by the sum of the signal acquired by delaying the transmission signal of the first relay system and the signal acquired by delaying the transmission signal of the second relay system. The wireless relay device 10 further eliminates, by use of an adder 108, the multiplied result from the reception signal (an output of the receiver 102) of the first relay system. This eliminated result becomes a transmission signal which is converted into a RF (Radio Frequency) signal with an up-converter, then amplified and transmitted from the first transmitting antenna.

The operation is the same with respect to the second relay system of the wireless relay device 10.

Each coupling loop interference cancellation weight generator of the wireless relay device 10, unlike the conventional coupling loop interference cancellation weight generators, generates the coupling loop interference cancellation weights of the coupling loop interference both from the first transmitting antenna and from the second transmitting antenna based on the transmission signals of both of the first relay system and the second relay system. Parameters of the reception signal and the transmission signal include amplitude and a phase.

In each coupling loop interference cancellation weight generator of the wireless relay device 10, however, two independent lines of coupling loop interference may be canceled based on the inputs of the two independent transmission signals. It is therefore difficult to calculate the coupling loop interference cancellation weight. Further, if the weight calculation based on the adaptive algorithm does not converge, an optimal coupling loop interference cancellation weight is not calculated. At this time, coupling loop interference canceling performance of the wireless relay device 10 declines, resulting in such a case that the wireless relay device 10 might be disabled from ensuring a sufficient relay gain.

First Example Of Configuration

Figure 6:
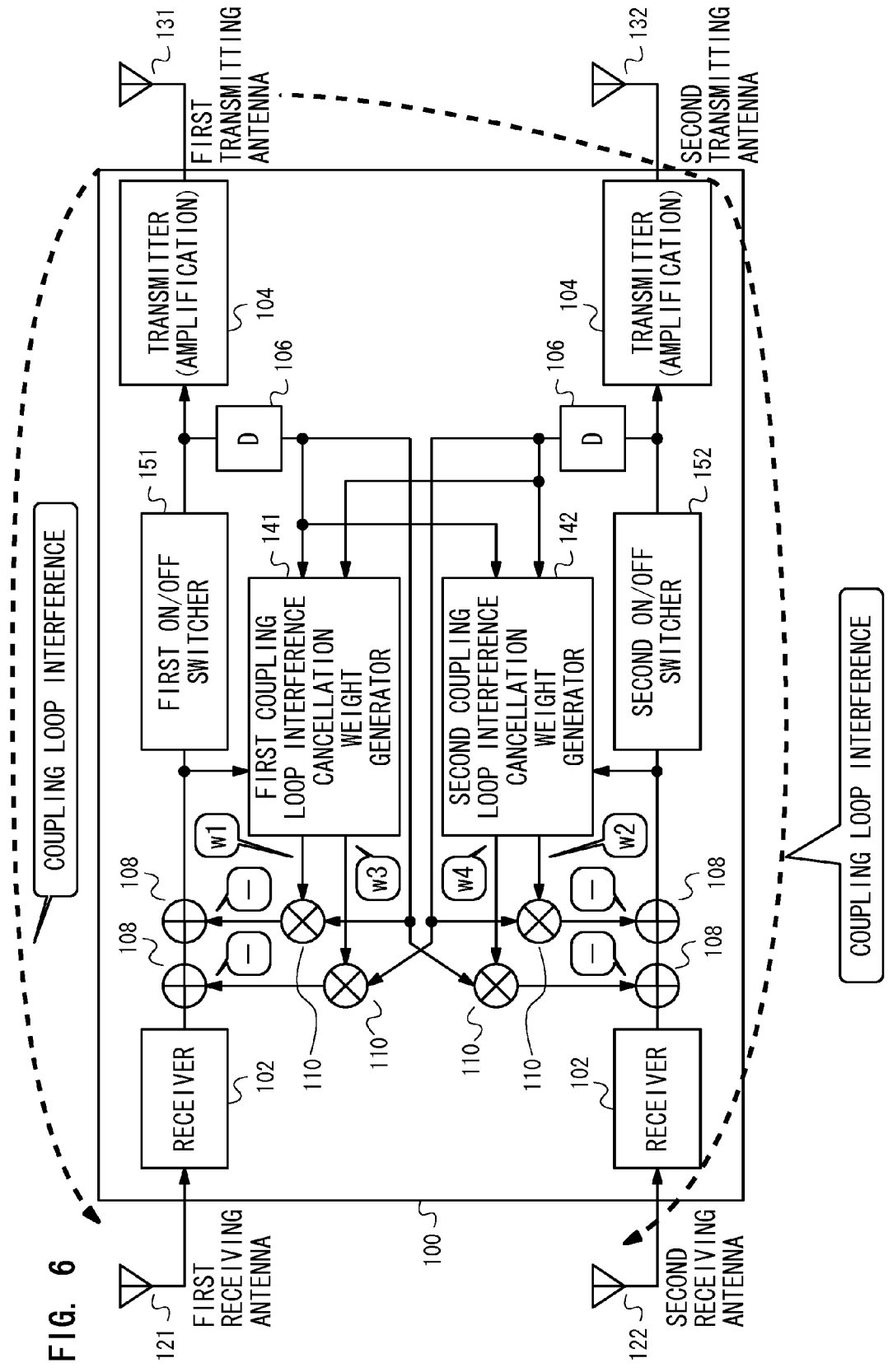
FIG. 6 is a diagram illustrating a first example of the configuration of the wireless relay device.

FIG. 6 is a diagram illustrating a first example of the configuration of the wireless relay device. A wireless relay device 100 in FIG. 6 includes an ON/OFF switcher on a per-relay-system basis, and can control the transmission of each relay system.

The wireless relay device 100 includes the first receiving antenna 121, the second receiving antenna 122, the receiver 102 which receives signals from any one of the receiving antennas, the plurality of adding units 108 and the plurality of multiplying units 110. Further, the wireless relay device 100 includes the first coupling loop interference cancellation weight generator 141, the second coupling loop interference cancellation weight generator 142, a first ON/OFF switcher 151, a second ON/OFF switcher 152 and the plurality of delay units 106. Moreover, the wireless relay device 100 has the transmitter 104 which transmits the signals from any one of the first transmitting antenna 131 and the second transmitting antenna 132.

The first relay system is configured by the first receiving antenna 121, the receiver 102 connecting with the first receiving antenna 121, the first coupling loop interference cancellation weight generator 141, the first ON/OFF switcher 151, the transmitter 104 connecting with the first transmitting antenna 131, the first transmitting antenna 131 and concomitant components thereof.

Similarly, the second relay system is configured by the second receiving antenna 122, the receiver 102 connecting with the second receiving antenna 122, the second coupling loop interference cancellation weight generator 142, the second ON/OFF switcher 152, the transmitter 104 connecting with the second transmitting antenna 132, the second transmitting antenna 132 and concomitant components thereof.

Among these processing units, an arbitrary plurality of units may also be organized into one single processing unit. Further, arbitrary one of these processing units may execute the processes as by the plurality of processing units. These respective processing units can be realized hardwarewise and softwarewise as well. This scheme is the same with respect to the components which will hereinafter be described.

The first receiving antenna 121 and the second receiving antenna 122 respectively receive the signals from the wireless base station.

The receiver 102 converts the signals received from the wireless base station by the first receiving antenna 121 or the second receiving antenna 122 into the digital signals. The receiver 102 executes the processes of extracting the necessary band with the filter, conducting the conversion into the baseband signal with the down-converter, adjusting the signal level under the AGC (Auto Gain Control), and performing the conversion into the digital signal with the A/D (Analog to Digital) converter.

The adding unit 108 eliminates the multiplied result by the multiplying unit 110 connected to the adding unit 108 from the reception signal.

The first ON/OFF switcher 151 and the second ON/OFF switcher 152 in linkage cut off the transmission signal of the relay system on one side by setting ON one of the two relay systems and OFF the other. The wireless relay device 100 relays from only one transmitting antenna by setting ON one relay system, with the result that the coupling loop interference occur from only one transmitting antenna. The first ON/OFF switcher 151 and the second ON/OFF switcher 152 normally set ON both the relay systems but do not cut off the transmission signals of both the relay systems. The first ON/OFF switcher 151 and the second ON/OFF switcher 152 notify the respective coupling loop interference cancellation weight generators of the ON-setting or OFF-setting.

Inputted to the first coupling loop interference cancellation weight generator 141 are a signal into which a signal acquired in a way that multiplies the signal obtained by delaying the transmission signal of the first relay system by the coupling loop interference cancellation weight is cancelled from a reception signal of the first relay system, the signal acquired by delaying the transmission signal of the first relay system and the signal acquired by delaying the transmission signal of the second relay system. The first coupling loop interference cancellation weight generator 141 calculates, based on the adaptive algorithm, the coupling loop interference cancellation weight of the first relay system by employing these inputted signals. The first coupling loop interference cancellation weight generator 141 may also calculate, based on another algorithm, the coupling loop interference cancellation weight of the first relay system. The parameters of the reception signal and the transmission signal include the amplitude and the phase. The coupling loop interference cancellation weight can be defined as a ratio at which to minimize signal power of a synthesized signal into which a coupling loop interference cancellation signal generated by changing the amplitude and the phase of the reception signal at a setting-enabled ratio, is cancelled from the reception signal.

The first coupling loop interference cancellation weight generator 141, when the transmission signal of one relay system is cut off by the first ON/OFF switcher 151 or the second ON/OFF switcher 152, calculates the coupling loop interference cancellation weight of the first relay system. At this time, one of the signal obtained by delaying the transmission signal of the first relay system and the signal obtained by delaying the transmission signal of the second relay system, which are inputted to the first coupling loop interference cancellation weight generator 141, is "0". Hence, the first coupling loop interference cancellation weight generator 141 can calculate the coupling loop interference cancellation weight with respect to the first transmitting antenna and the coupling loop interference cancellation weight with respect to the second transmitting antenna.

The delaying unit 106 outputs the signal obtained by delaying the transmission signal corresponding to the coupling loop interference.

The transmitter 104 converts the transmission signal into the analog signal and transmits the analog signal to the first transmitting antenna 131 or the second transmitting antenna 132. The transmitter 104 includes a D/A (Digital to Analog) converter, an up-converter which converts the signal into the RF signal, and an amplifier.

The first transmitting antenna 131 and the second transmitting antenna 132 respectively transmit the signals toward the terminal.

The example that the wireless relay device has the two relay systems is illustrated herein, however, the configuration is the same but can have two or more relay systems.

Operational Example

Next, an operational example of the wireless relay device 100 will hereinafter be discussed. A coupling loop interference cancellation weight generating operation of the wireless relay device 100 will hereinafter be described.

<Outline of Operation>

Each relay system of the wireless relay device 100 has the ON/OFF switcher capable of switching ON and OFF alternately the relay system. The relay is conducted from only one transmitting antenna by switching ON only any one of the plurality of relay systems, and an interval (period) for which the coupling loop interference occur from only one transmitting antenna is provided. The coupling loop interference cancellation weight of the coupling loop interference from each transmitting antenna of the wireless relay device 100 can be individually generated in a way that sequentially switches the relay system with the changeover switch being switched ON.

The interval (period) for which to perform the relay from one transmitting antenna is determined based on a converging speed of the coupling loop interference cancellation weight. A frequency of performing only the relay from one transmitting antenna is determined based on a fluctuation speed of a propagation characteristic of the coupling loop interference. If the transmitting antenna and the receiving antenna of the wireless relay device 100 are fixed, it follows that the propagation characteristic of the coupling loop interference fluctuates due to a change in ambient propagation environment. A fluctuation speed of the propagation characteristic of the coupling loop interference is slower than a fading fluctuation undergone by the terminal. Accordingly, the coupling loop interference cancellation weight has no necessity of continuously being updated at all times but can be periodically updated corresponding to the fluctuation speed of the propagation characteristic. Moreover, the interval (period) for which to perform the relay from one transmitting antenna can be set short by using the adaptive algorithm with the fast convergence such as RLS (Recursive Least Square) for generating the coupling loop interference cancellation weight.

In the first example of the configuration, the coupling loop interference cancellation weight is generated in such a way that one single relay system in the plurality of relay systems performs the wireless relay, and hence the relay continuity can be kept without switching OFF the relay completely. A state at the moment when the ON/OFF switcher conducts the switchover appears as an abrupt change in propagation characteristic, and consequently the receiving characteristic at the terminal might decline. In mobile communications, however, the abrupt change can occur as the terminal moves. In the communication system where Link Adaptation such as adaptive modulation and adaptive antenna control is carried out, the antenna adaptive to the propagation characteristic is selected (switchover of MIMO/non-MIMO), and the communication speed (a modulation method and a coding rate) is selected, thereby restraining influence of the ON/OFF switchover.

<Operation Flow>

Figure 7:
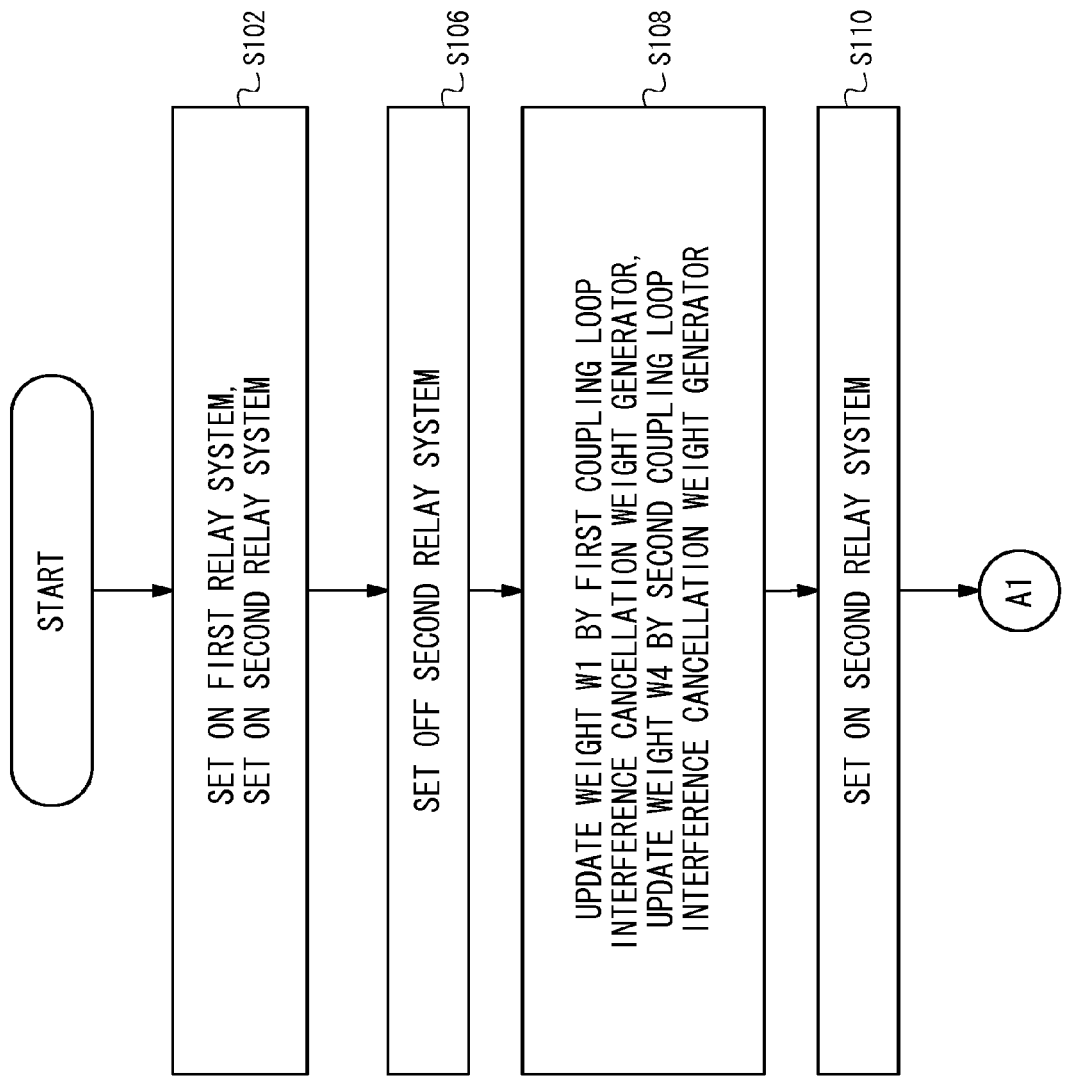
FIG. 7 is a flowchart illustrating an operation flow (1) in the first example of the configuration.
Figure 8:
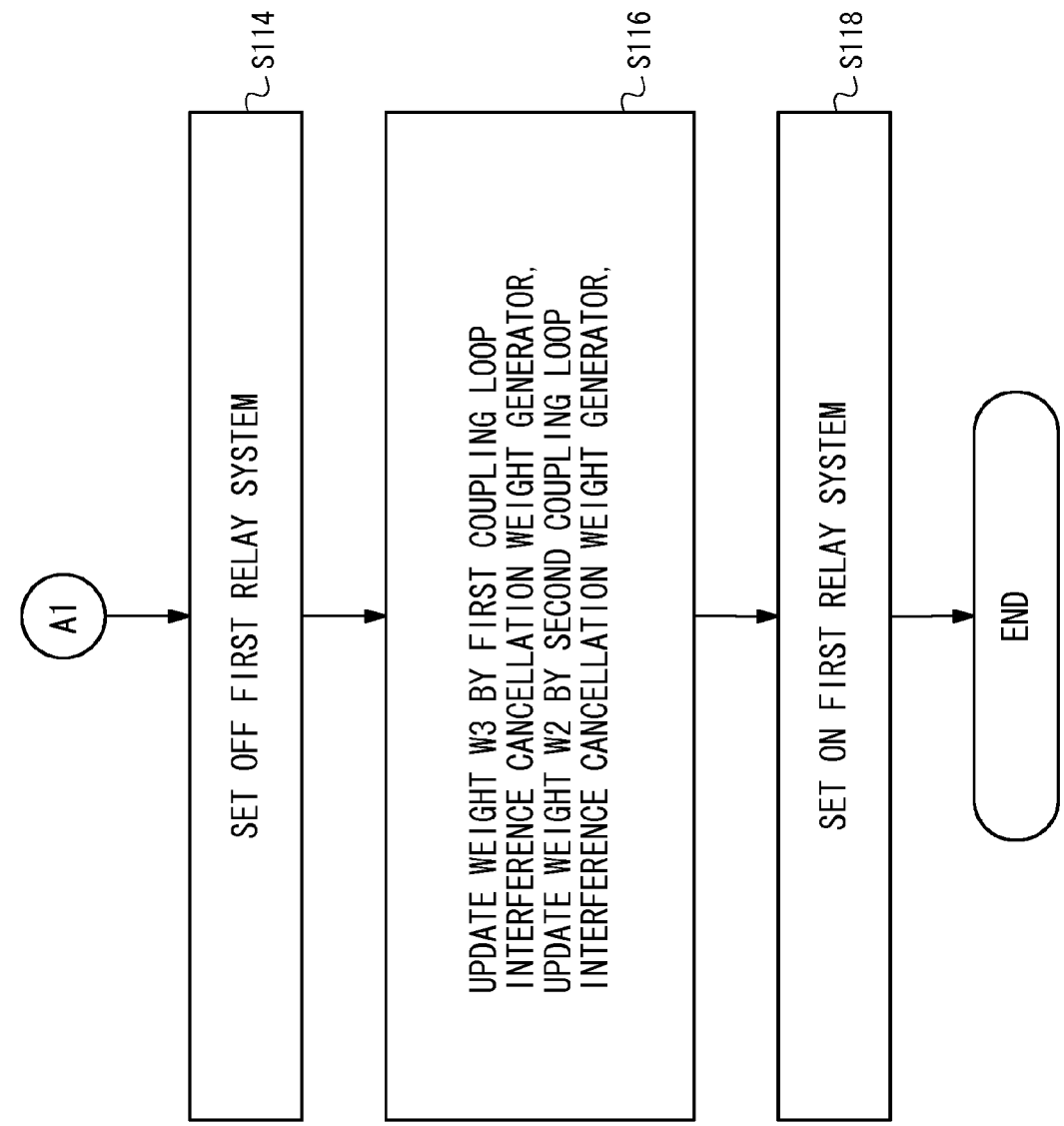
FIG. 8 is a flowchart illustrating an operation flow (2) in the first example of the configuration.

FIGS. 7 and 8 are flowcharts each illustrating an operation flow in the first example of the configuration. A1 in FIG. 8 is continued from A1 in FIG. 7.

The first ON/OFF switcher 151 of the wireless relay device 100 sets ON the first relay system. Further, the second ON/OFF switcher 152 of the wireless relay device 100 sets ON the second relay system (S102). The phrase [set ON] connotes that the relay is conducted through this relay system. While on the other hand, the phrase [set OFF] connotes that the relay is not carried out through this relay system by cutting off the transmission signal. At this time, the wireless relay device 100 performs the wireless relay by use of the first relay system and the second relay system.

Herein, the second ON/OFF switcher 152 of the wireless relay device 100 sets OFF the second relay system (S106). At this time, the relay signal is transmitted from only the first transmitting antenna 131. Accordingly, as in FIG. 6, the coupling loop interference are two lines of waves, i.e., from the first transmitting antenna to the first receiving antenna and from the first transmitting antenna to the second receiving antenna.

Only the transmission signal of the first relay system is inputted to the first coupling loop interference cancellation weight generator 141. Hence, the first coupling loop interference cancellation weight generator 141 generates the coupling loop interference cancellation weight (weight W1) by use of the conventional simple adaptive algorithm (S108). The weight W1 is a weight for canceling the influence, exerted on the first relay system, of the coupling loop interference coming from the first transmitting antenna.

Further, only the transmission signal of the first relay system is also inputted to the second coupling loop interference cancellation weight generator 142. Therefore, the second coupling loop interference cancellation weight generator 142 generates the coupling loop interference cancellation weight (weight W4) by use of the conventional simple adaptive algorithm (S108). The weight W4 is a weight for canceling the influence, exerted on the second relay system, of the coupling loop interference coming from the first transmitting antenna.

The weight W1 and the weight W4 are multiplied by the transmission signal of the first relay system. A multiplication result is cancelled from the reception signal of each relay system.

After finishing updating the weight W1 and weight W4, the second ON/OFF switcher 152 of the wireless relay device 100 sets ON the second relay system (S110).

The first ON/OFF switcher 151 of the wireless relay device 100 sets OFF the first relay system (S114). At this time, the relay signal is transmitted from only the second transmitting antenna 132. Accordingly, the coupling loop interference are the two lines of waves, i.e., from the second transmitting antenna to the first receiving antenna and from the second transmitting antenna to the second receiving antenna.

Only the transmission signal of the second relay system is inputted to the first coupling loop interference cancellation weight generator 141. Hence, the first coupling loop interference cancellation weight generator 141 generates the coupling loop interference cancellation weight (weight W2) by use of the conventional simple adaptive algorithm (S116). The weight W2 is a weight for canceling the influence, exerted on the first relay system, of the coupling loop interference coming from the second transmitting antenna.

Moreover, only the transmission signal of the second relay system is also inputted to the second coupling loop interference cancellation weight generator 142. Therefore, the second coupling loop interference cancellation weight generator 142 generates the coupling loop interference cancellation weight (weight W3) by use of the conventional simple adaptive algorithm (S116). The weight W3 is a weight for canceling the influence, exerted on the second relay system, of the coupling loop interference coming from the second transmitting antenna.

The weight W2 and the weight W3 are multiplied by the transmission signal of the second relay system. A multiplication result is cancelled from the reception signal of each relay system.

After finishing updating the weight W2 and weight W3, the first ON/OFF switcher 151 of the wireless relay device 100 sets ON the first relay system (S118).

The wireless relay device 100 can periodically generate the coupling loop interference cancellation weight.

With the operation described above, the coupling loop interference cancellation weight is generated, and the influence of the coupling loop interference from the reception signal is canceled by employing the generated weight. In the status where all of the relay systems are set ON, the coupling loop interference cancellation weight is not updated.

<Operation and Effect in First Example of Configuration>

The wireless relay device in the first example of the configuration enables only one relay system to operate in the plurality of relay systems. According to the first example of the configuration, the coupling loop interference cancellation weight can be generated on a per-transmitting-antenna basis by enabling only one relay system to operate in the plurality of relay systems.

According to the first example of the configuration, each relay system can generate the coupling loop interference cancellation weight, which cancels the influence of the coupling loop interference from the transmitting antenna, on the per-transmitting-antenna basis without completely cutting off the wireless relay.

Second Example Of Configuration

A second example of the configuration has common points to the first example of the configuration. Accordingly, the discussion will be focused on different points.

Figure 9:
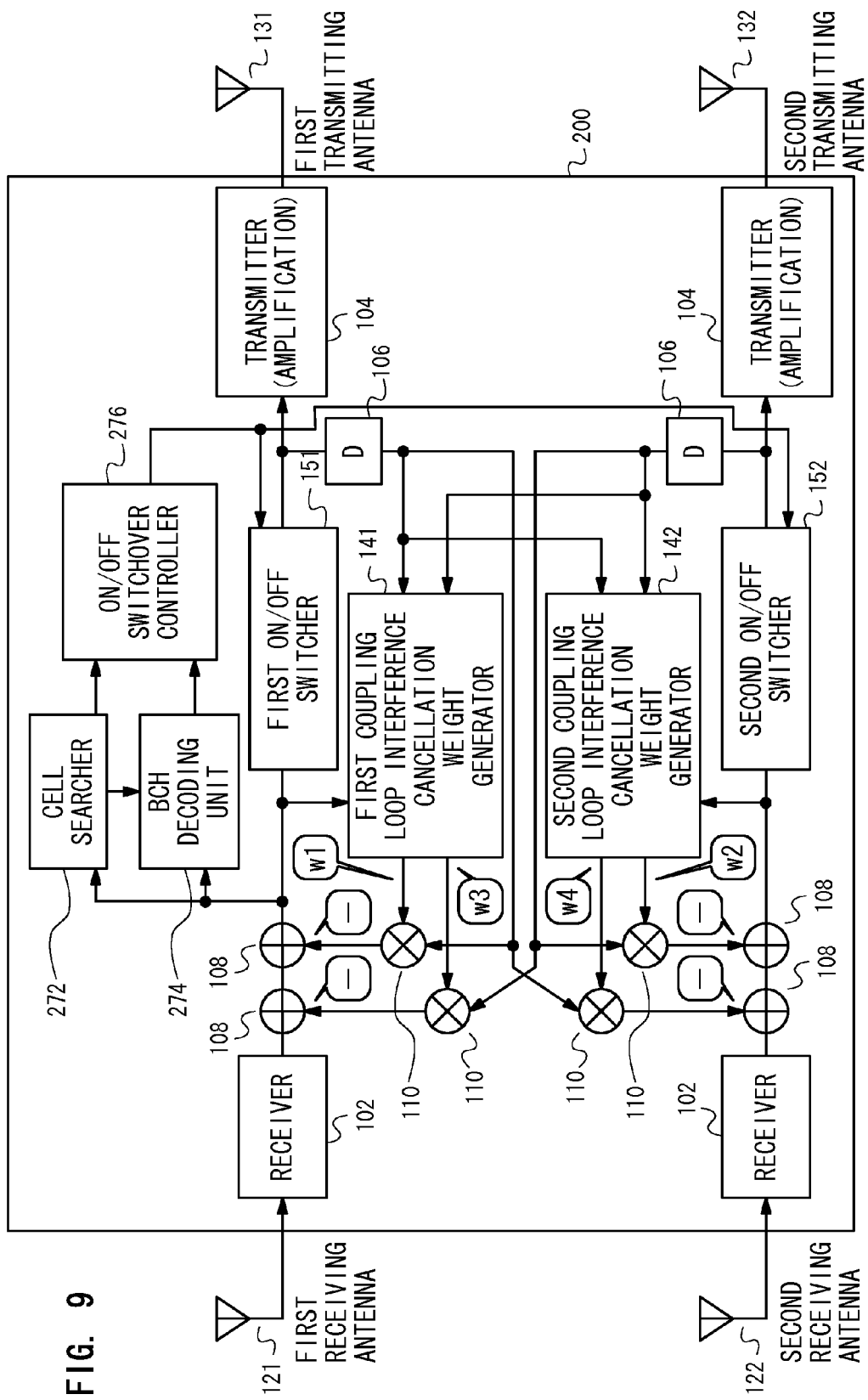
FIG. 9 is a diagram illustrating a second example of the configuration of the wireless relay device.

FIG. 9 is a diagram illustrating the second example of the configuration of the wireless relay device. A wireless relay device 200 in FIG. 9 includes a cell searcher 272, a BCH (Broadcast Channel) decoding unit 274 and an ON/OFF switching controller 276, and can control the ON/OFF switcher of each relay system based on information such as a broadcasting control channel (BCCH).

The wireless relay device 200 includes the first receiving antenna 121, the second receiving antenna 122, the receiver 102 which receives signals from any one of the receiving antennas, the plurality of adding units 108 and the plurality of multiplying units 110. Further, the wireless relay device 200 includes the first coupling loop interference cancellation weight generator 141, the second coupling loop interference cancellation weight generator 142, the first ON/OFF switcher 151, the second ON/OFF switcher 152 and the plurality of delay units 106. Moreover, the wireless relay device 200 has the first transmitting antenna 131, the second transmitting antenna 132, and the transmitter 104 which transmits the signals from any one of the transmitting antennas. Moreover, the wireless relay device 200 includes the cell searcher 272, the BCH (Broadcast Channel) decoding unit 274 and the ON/OFF switching controller 276.

The cell searcher 272 can execute initial synchronization with the base station. The cell searcher 272 can detect timing of a sub-frame (Sub-frame).

The BCH (Broadcast Channel) decoding unit 274 can acquire the broadcasting control channel information by decoding the BCH.

The ON/OFF switching controller 276 controls, based on the information of the cell searcher 272 and the BCH decoding unit 274, the first ON/OFF switcher 151 and the second ON/OFF switcher 152.

Exemplified herein is the wireless relay device including the two relay systems, however, with the same configuration, the wireless relay device can have two or more relay systems.

Operational Example

Next, an operational example of the wireless relay device 200 will hereinafter be discussed. The coupling loop interference cancellation weight generating operation of the wireless relay device 200 will hereinafter be described.

<Outline of Operation>

In the present operational example, the ON/OFF switching of the wireless relay device is carried out by utilizing switchover timing of the MIMO transmission and a non-MIMO transmission in the wireless communication system in order to reduce the influence of the ON/OFF switching. For example, an LTE (Long Term Evolution) defined as a next generation mobile communication system, of which the standardization is underway in the 3GPP, involves periodically inserting at a specified interval a sub-frame (which is a communication unit of 1 ms) for the transmission of an MBMS (Multimedia Broadcast Multicast Service) channel. The MIMO transmission is not applied to the MBMS, and hence the wireless relay device 200 provides an interval (period) for which to perform only the relay from one transmitting antenna at the timing of the sub-frame for the MBMS transmission.

The MIMO transmission is not conducted in the MBMS, so that nothing affects the transmission characteristic even when relaying through the single relay system. Consequently, the influence on the characteristic can be restrained smaller than in the case of relaying through one relay system during the interval (period) for which the MIMO transmission is conducted.

<Operation Flow>

Figure 10:
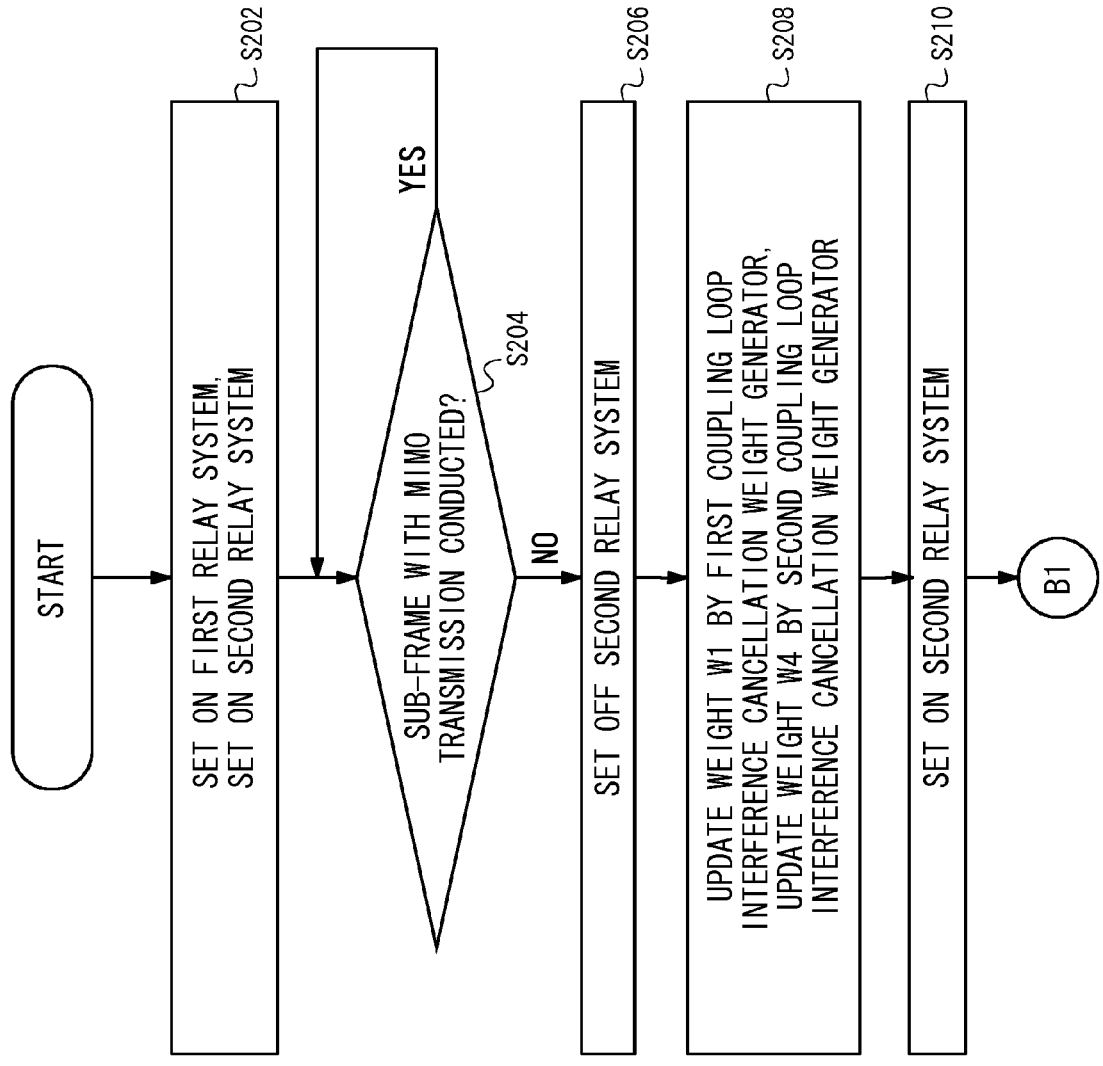
FIG. 10 is a flowchart illustrating an operation flow (1) in the second example of the configuration.
Figure 11:
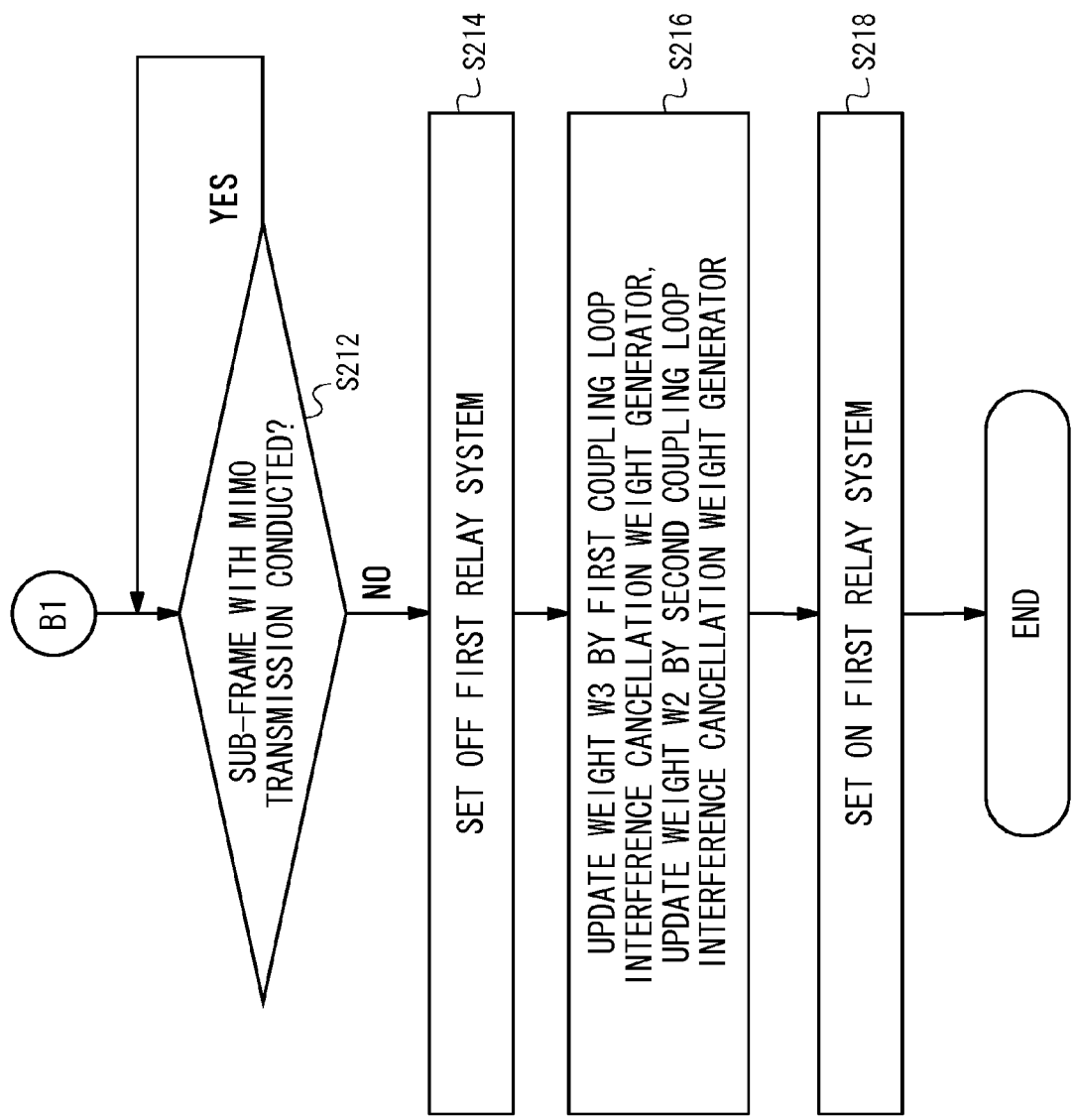
FIG. 11 is a flowchart illustrating an operation flow (2) in the second example of the configuration.

FIGS. 10 and 11 are flowcharts each illustrating an operation flow in the second example of the configuration. B1 in FIG. 11 is continued from B1 in FIG. 10.

The first ON/OFF switcher 151 of the wireless relay device 200 sets ON the first relay system. Further, the second ON/OFF switcher 152 of the wireless relay device 100 sets ON the second relay system (S202). At this time, the wireless relay device 200 performs the wireless relay by use of the first relay system and the second relay system.

The reception signal, after canceling the coupling loop interference in the first relay system, is inputted to the cell searcher 272 and the BCH decoding unit 274 of the wireless relay device 200.

The cell searcher 272 can detect the sub-frame timing by a correlative operation of the synchronous channel contained in the reception signal. Further, the cell searcher 272 can recognize timing and a frame number of a radio frame (Radio Frame) by taking a correlation with a pilot channel.

The BCH decoding unit 274 can obtain broadcasting control channel information by decoding the BCH superimposed on the reception signal in a way that uses the timing detected by the cell searcher 272. The BCH decoding unit 274 can acquire pieces of information of the sub-frame on which the MBMS signal is superimposed and of the sub-frame undergoing no execution of the MIMO transmission, which are contained in the broadcasting control channel.

The ON/OFF switching controller 276 recognizes, based on the timing information from the cell searcher 272 and the sub-frame information from the BCH decoding unit 274, the timing at which the MIMO transmission is not conducted.

The ON/OFF switching controller 276 checks whether or not the present frame is the sub-frame undergoing the execution of the MIMO transmission (S204). If being the sub-frame undergoing the execution of the MIMO transmission (S204; YES), the operation does not advance to the next process. If being the sub-frame undergoing none of the execution of the MIMO transmission (S204; NO), the ON/OFF switching controller 276 instructs the second ON/OFF switcher 152 to set OFF the second relay system.

The second ON/OFF switcher 152 of the wireless relay device 200 sets OFF the second relay system according to the instruction given from the ON/OFF switching controller 276 (S206). At this time, the relay signal is transmitted from only the first transmitting antenna 131. Accordingly, the coupling loop interference are the two lines of waves, i.e., from the first transmitting antenna to the first receiving antenna and from the first transmitting antenna to the second receiving antenna.

Only the transmission signal of the first relay system is inputted to the first coupling loop interference cancellation weight generator 141. Hence, the first coupling loop interference cancellation weight generator 141 generates the coupling loop interference cancellation weight (weight W1) by use of the conventional simple adaptive algorithm (S208). The weight W1 is a weight for canceling the influence, exerted on the first relay system, of the coupling loop interference coming from the first transmitting antenna.

Moreover, only the transmission signal of the first relay system is also inputted to the second coupling loop interference cancellation weight generator 142. Therefore, the second coupling loop interference cancellation weight generator 142 generates the coupling loop interference cancellation weight (weight W4) by use of the conventional simple adaptive algorithm (S208). The weight W4 is a weight for canceling the influence, exerted on the second relay system, of the coupling loop interference coming from the first transmitting antenna.

The weight W1 and the weight W4 are multiplied by the transmission signal of the first relay system. A multiplication result is cancelled from the reception signal of each relay system.

After finishing updating the weight W1 and weight W4, the second ON/OFF switcher 152 of the wireless relay device 200 sets ON the second relay system (S210).

The ON/OFF switching controller 276 checks whether or not the present frame is the sub-frame undergoing the execution of the MIMO transmission (S212). If being the sub-frame undergoing the execution of the MIMO transmission (S212; YES), the operation does not advance to the next process. If being the sub-frame undergoing none of the execution of the MIMO transmission (S212; NO), the ON/OFF switching controller 276 instructs the first ON/OFF switcher 151 to set OFF the first relay system.

The first ON/OFF switcher 151 of the wireless relay device 200 sets OFF the first relay system (S214). At this time, the relay signal is transmitted from only the second transmitting antenna 132. Accordingly, the coupling loop interference are the two lines of waves, i.e., from the second transmitting antenna to the first receiving antenna and from the second transmitting antenna to the second receiving antenna.

Only the transmission signal of the second relay system is inputted to the first coupling loop interference cancellation weight generator 141. Hence, the first coupling loop interference cancellation weight generator 141 generates the coupling loop interference cancellation weight (weight W2) by use of the conventional simple adaptive algorithm (S216).

The weight W2 is a weight for canceling the influence, exerted on the first relay system, of the coupling loop interference coming from the second transmitting antenna.

Further, only the transmission signal of the second relay system is also inputted to the second coupling loop interference cancellation weight generator 142. Hence, the second coupling loop interference cancellation weight generator 142 generates the coupling loop interference cancellation weight (weight W3) by use of the conventional simple adaptive algorithm (S216). The weight W3 is a weight for canceling the influence, exerted on the second relay system, of the coupling loop interference coming from the second transmitting antenna.

The weight W2 and the weight W3 are multiplied by the transmission signal of the second relay system. A multiplication result is cancelled from the reception signal of each relay system.

After finishing updating the weight W2 and weight W3, the first ON/OFF switcher 151 of the wireless relay device 200 sets ON the first relay system (S218).

With the operation described above, the coupling loop interference cancellation weight is generated, and the influence of the coupling loop interference from the reception signal is canceled by employing the generated weight. In the status where all of the relay systems are set ON, the coupling loop interference cancellation weight is not updated.

<Operation and Effect in Second Example of Configuration>

According to the second example of the configuration, in the wireless relay device, the coupling loop interference cancellation weight can be calculated during the interval (period) for which the MIMO transmission is not performed in such a way that the wireless base station broadcasts the information about the interval for which the MIMO transmission is carried out and the information about the interval for which the MIMO transmission is not carried out.

According to the second example of the configuration, the influence of the decline of the characteristic due to the ON/OFF switching can be restrained by providing the interval (period) for which to perform only the relay from one transmitting antenna, corresponding to the interval (period) for which the MIMO transmission is not conducted.

All example and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A wireless relay device comprising:
a first receiving unit receiving a radio signal;
a first generating unit generating a coupling loop interference cancellation weight defined as a ratio at which to minimize signal power of a synthesized signal into which a coupling loop interference cancellation signal canceling coupling loop interference getting wrapped around and received by the first receiving unit when transmitting a relay signal to the outside from a single transmitting unit based on the radio signal and generated by changing an amplitude and a phase of the relay signal at a setting-enabled ratio, is cancelled from the reception signal received by the first receiving unit;
a first canceling unit outputting a signal into which the signal of the coupling loop interference is cancelled, based on the coupling loop interference cancellation weight generated by the first generating unit, from the signal received by the first receiving unit;
a first transmitting unit transmitting the signal as the radio signal, which is output by the first canceling unit;
a first switching unit cutting off the transmission of the signal from the first transmitting unit;
a second receiving unit receiving the radio signal;
a second generating unit generating the coupling loop interference cancellation weight defined as a ratio at which to minimize the signal power of the synthesized signal into which the coupling loop interference cancellation signal canceling the coupling loop interference getting wrapped around and received by the second receiving unit when transmitting the relay signal to the outside from the single transmitting unit based on the radio signal and generated by changing the amplitude and the phase of the relay signal at the setting-enabled ratio, is cancelled from the reception signal received by the second receiving unit;
a second canceling unit outputting the signal into which the signal of the coupling loop interference is cancelled, based on the coupling loop interference cancellation weight generated by the second generating unit, from the signal received by the second receiving unit;
a second transmitting unit transmitting the signal as the radio signal, which is output by the second canceling unit; and
a second switching unit cutting off the transmission of the signal from the second transmitting unit,
wherein when the first switching unit cuts off the transmission of the signal from the first transmitting unit, the first generating unit generates a third coupling loop interference cancellation weight for canceling the signal of the coupling loop interference of the radio signal from the second transmitting unit from the reception signal of the first receiving unit, while the second generating unit generates a second coupling loop interference cancellation weight for canceling the signal of the coupling loop interference of the radio signal from the second transmitting unit from the reception signal of the second receiving unit,
when the second switching unit cuts off the transmission of the signal from the second transmitting unit, the first generating unit generates a first coupling loop interference cancellation weight for canceling the signal of the coupling loop interference of the radio signal from the first transmitting unit from the reception signal of the first receiving unit, while the second generating unit generates a fourth coupling loop interference cancellation weight for canceling the signal of the coupling loop interference of the radio signal from the first transmitting unit from the reception signal of the second receiving unit,
the first canceling unit outputs a signal into which a signal obtained by changing the amplitude and the phase of the transmission signal that should be transmitted by the first transmitting unit at a ratio designated by the first weight and a signal obtained by changing the amplitude and the phase of the transmission signal that should be transmitted by the second transmitting unit at a ratio designated by the third weight, are canceled from the signal received by the first receiving unit, and the second canceling unit outputs a signal into which a signal obtained by changing the amplitude and the phase of the transmission signal that should be transmitted by the first transmitting unit at a ratio designated by the fourth weight and a signal obtained by changing the amplitude and the phase of the transmission signal that should be transmitted by the second transmitting unit at a ratio designated by the second weight, are canceled from the signal received by the second receiving unit.

2. The wireless relay device according to claim 1, further comprising:
 a detecting unit detecting a period for which to perform none of a multiple-input multiple-output (MIMO) transmission in which the transmission signals transmitted from a plurality of transmitting antennas are received by a plurality of antennas; and
 an instructing unit instructing the first switching unit or the second switching unit to cut off the transmission of the signals during a period for which to perform none of the MIMO transmission, the period being detected by the detecting unit.

3. The wireless relay device according to claim 2, wherein the detecting unit receives information about the period for which to perform none of the MIMO transmission, the information being transmitted by another wireless device, and detects based on the receiving information the period for which to perform none of the MIMO transmission.

4. A wireless relay device comprising:
 a plurality of relay units each including:
  a receiving unit receiving a radio signal;
  a generating unit generating a coupling loop interference cancellation weight defined as a ratio at which to minimize signal power of a synthesized signal into which a coupling loop interference cancellation signal canceling coupling loop interference getting wrapped around and received by the receiving unit when transmitting a relay signal to the outside from a single transmitting unit based on the radio signal and generated by changing an amplitude and a phase of the relay signal at a setting-enabled ratio, is cancelled from the radio signal received by the receiving unit;
  a canceling unit outputting a signal into which the signal of the coupling loop interference is cancelled, based on the coupling loop interference cancellation weight generated by the generating unit, from the signal received by the receiving unit; and
  a transmitting unit transmitting the signal output by the canceling unit as the radio signal; and
 a switching unit transmitting the radio signal from the transmitting unit of one of the plurality of relay units and cutting off the transmissions of the radio signals from the transmitting units of the relay units other than the one relay unit,
wherein the switching unit sequentially switching over the single relay unit which transmits the radio signal,
 the generating unit of the each relay unit generates, on a per-transmitting-unit basis of the single relay unit which transmits the radio signal, the coupling loop interference cancellation weight for canceling the signal of the coupling loop interference of the radio signal from the transmitting unit of the single relay unit which transmits the radio signal from the reception signal of the receiving unit of the each relay unit, and
 the canceling unit of the each relay unit outputs a signal obtained by canceling the signal of the coupling loop interference from the each transmitting unit from the signal received by the receiving unit of the relay unit based on the weight per the transmitting unit, which is generated by the generating unit of the relay unit.

5. The wireless relay device according to claim 4, further comprising:
 a detecting unit detecting a period for which to perform none of a MIMO transmission; and
 an instructing unit instructing the switching unit to sequentially switch over the single relay unit which transmits the radio signal during the period for which to perform none of the MIMO transmission, the period being detected by the detecting unit.

6. The wireless relay device according to claim 5, wherein the detecting unit receives information about the period for which to perform none of the MIMO transmission, the information being transmitted by another wireless device, and detects based on the received information the period for which to perform none of the MIMO transmission.

* * * * *